US 7,418,582 B1

(12) United States Patent
Iacobovici et al.

(10) Patent No.: US 7,418,582 B1
(45) Date of Patent: Aug. 26, 2008

(54) VERSATILE REGISTER FILE DESIGN FOR A MULTI-THREADED PROCESSOR UTILIZING DIFFERENT MODES AND REGISTER WINDOWS (75) Inventors: Sorin Iacobovici, San Jose, CA (US); Daniel Leibholz, Newton, MA (US); David J. Greenhill, Portola Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 262 days.

(21) Appl. No.: 10/844,931

(22) Filed: May 13, 2004

(51) Int. Cl.
*G06F 9/30* (2006.01)
(52) U.S. Cl. ...................... 712/228; 712/229
(58) Field of Classification Search .............. 712/220, 712/229, 228
See application file for complete search history.

(56) References Cited

U.S. PATENT DOCUMENTS

| | | | |
|---|---|---|---|
| 4,425,616 A * | 1/1984 | Woodell ............... 718/107 |
| 5,446,854 A | 8/1995 | Khalidi et al. |
| 5,465,337 A | 11/1995 | Kong |
| 5,479,627 A | 12/1995 | Khalidi et al. |
| 5,596,293 A | 1/1997 | Rogers et al. |
| 5,717,885 A | 2/1998 | Kumar et al. |
| 5,761,511 A | 6/1998 | Gibbons et al. |
| 5,802,341 A | 9/1998 | Kline et al. |
| 5,842,225 A | 11/1998 | Kohn |
| 5,860,147 A | 1/1999 | Gochman et al. |
| 5,895,487 A | 4/1999 | Boyd et al. |
| 5,899,994 A | 5/1999 | Mohamed et al. |
| 5,900,011 A | 5/1999 | Saulsbury et al. |
| 5,911,071 A | 6/1999 | Jordan |
| 5,918,005 A | 6/1999 | Moreno et al. |
| 5,933,627 A | 8/1999 | Parady |
| 5,941,977 A | 8/1999 | Panwar et al. ............ 712/23 |
| 5,953,010 A | 9/1999 | Kampe et al. |
| 5,956,756 A | 9/1999 | Khalidi et al. |
| 5,991,790 A | 11/1999 | Shah et al. |
| 6,016,542 A | 1/2000 | Gottlieb et al. |
| 6,044,446 A | 3/2000 | Joy et al. |
| 6,081,880 A * | 6/2000 | Sollars ................. 711/202 |
| 6,092,154 A | 7/2000 | Curtis et al. |
| 6,092,175 A * | 7/2000 | Levy et al. .............. 712/23 |
| 6,098,169 A | 8/2000 | Ranganathan |
| 6,105,127 A | 8/2000 | Kimura et al. |
| 6,141,692 A | 10/2000 | Loewenstein et al. |
| 6,185,660 B1 | 2/2001 | Mulla et al. ............ 711/140 |
| 6,199,142 B1 | 3/2001 | Saulsbury et al. |
| 6,219,723 B1 * | 4/2001 | Hetherington et al. ........ 710/18 |

(Continued)

OTHER PUBLICATIONS

The SPARC Architecture Manual, 1992, SPARC international, Inc., Version 8, pp. 1-41.*

(Continued)

*Primary Examiner*—Tonia L. M. Dollinger
(74) *Attorney, Agent, or Firm*—Osha Liang LLP (57) ABSTRACT

A method for optimizing a register file hierarchy in a multi-threaded processor. The method includes providing a register file hierarchy with a plurality of register file cells, associating the plurality of register file cells with respective threads when the processor is operating in a multithreaded mode and flattening the plurality of register file cells with a single thread when the processor is operating in a single threaded mode. The register file cells correspond to threads of the multi-threaded processor.

24 Claims, 4 Drawing Sheets

U.S. PATENT DOCUMENTS

| | | |
|---|---|---|
| 6,308,279 B1 | 10/2001 | Toll et al. |
| 6,311,261 B1 | 10/2001 | Chamdani et al. |
| 6,314,563 B1 | 11/2001 | Agesen et al. |
| 6,374,349 B1 | 4/2002 | McFarling |
| 6,408,368 B1 | 6/2002 | Parady |
| 6,449,694 B1 | 9/2002 | Burgess, Jr. et al. |
| 6,493,819 B1 | 12/2002 | Mahurin et al. |
| 6,535,905 B1 | 3/2003 | Kalafatis et al. |
| 6,578,137 B2 | 6/2003 | Parady |
| 6,609,193 B1 | 8/2003 | Douglas et al. |
| 6,671,707 B1 | 12/2003 | Hudson et al. |
| 6,700,410 B2 | 3/2004 | Ebergen |
| 6,700,825 B1 | 3/2004 | Ebergen |
| 6,715,057 B1 | 3/2004 | Kessler et al. |
| 6,718,438 B2 | 4/2004 | Lewis et al. |
| 6,718,494 B1 | 4/2004 | Jamil et al. |
| 6,732,143 B1 | 5/2004 | Saulsbury |
| 6,751,655 B1 | 6/2004 | Deutsch et al. |
| 6,766,428 B2 | 7/2004 | Saulsbury et al. |
| 6,772,369 B2 | 8/2004 | Smith et al. |
| 6,779,087 B2 | 8/2004 | Saulsbury et al. |
| 6,802,039 B1 | 10/2004 | Quach et al. |
| 6,816,961 B2 | 11/2004 | Rice et al. |
| 6,823,473 B2 | 11/2004 | Mukherjee |
| 6,854,075 B2 | 2/2005 | Mukherjee et al. |
| 2001/0047468 A1 | 11/2001 | Parady |
| 2002/0052926 A1 | 5/2002 | Bush et al. |
| 2002/0056037 A1* | 5/2002 | Wolrich et al. .............. 712/215 |
| 2002/0087840 A1 | 7/2002 | Kottapalli et al. |
| 2002/0129309 A1 | 9/2002 | Floyd et al. |
| 2002/0162092 A1 | 10/2002 | Ravichandran |
| 2003/0002974 A1 | 1/2003 | Gunnarsson |
| 2003/0097518 A1 | 5/2003 | Kohn et al. |
| 2003/0131277 A1 | 7/2003 | Taylor et al. |
| 2004/0003211 A1 | 1/2004 | Damron |
| 2004/0006633 A1 | 1/2004 | Chandra et al. |
| 2004/0034853 A1 | 2/2004 | Gibbons et al. |
| 2004/0073778 A1* | 4/2004 | Adiletta et al. .............. 712/220 |
| 2004/0088487 A1 | 5/2004 | Barroso et al. |
| 2004/0098496 A1 | 5/2004 | Wolrich et al. |
| 2004/0148472 A1 | 7/2004 | Barroso et al. |
| 2005/0114856 A1 | 5/2005 | Eickemeyer et al. |
| 2005/0193283 A1 | 9/2005 | Reinhardt et al. |

OTHER PUBLICATIONS

Rajeev Balasubramanian, Sandhya Dwarkadas, David H. Albonesi, "Reducing the Complexity of the Register File in Dynamic Superscalar Processors," International Symposium on Microarchitecture, Proceedings of the 34th Annual ACM/IEEE International Symposium on Microarchitecture, pp. 23-248, Mar. 2001.

Peter Magnusson, "Understanding Stacks and Registers in the SPARC Archiecture(s)," http://www.sics.se/~psm/sparkstack.html, Apr. 1997.

Mukherjee, S. et al., "Detailed Design and Evaluation of Redundant Multithreading Alternatives," Computer Architecture, 2002, Proceedings 29th Annual International Symposium, pp. 1-12.

Reinhardt, S.K. et al., "Transient Fault Detection via Simultaneous Multithreading," Computer Architecture, 2000, Proceedings of the 27th International Symposium, 12 pages.

Kharbutli, M. et al., "Using Prime Numbers for Cache Indexing to Eliminate Conflict Misses," 10th Annual Symposium on High Performance Computer Architecture, Feb. 14-18, 2004, 12 pages.

Kalla, R. et al., "IBM Power5 Chip: A Dual-Core Multithreaded Processor," Published by the IEEE Computer Society, Mar.-Apr. 2004, pp. 40-47.

Watanabe, K. et al., "Exploiting Java Instruction/Thread Level Parallelism with Horizontal Multithreading," IEEE, 2001, pp. 122-129.

Hennessy, J. et al., "Computer Architecture: A Quantitative Approach," Morgan Kaufmann, third edition, 2002, pp. A-68 to A-77.

Hoe, J.C. "Superscalar Out-of-Order Demystified in Four Instructions," 2003, http://www.ece.cmu.edu/~jhoe/distribution/2003/wcae03.pdf, pp. 1-6.

Chen, S. et al., "Out-of-Order Memory Accesses Using a Load Wait Buffer," http://www.ece.cmu.edu/~schen1/18-741_final_report.pdf, pp. 1-8.

* cited by examiner

| Reg. | Strand # | Window # | Reg. Type Bits | Even_N/Odd_Win |
|---|---|---|---|---|
| %i3 | 3 | 5 | IN | 1 |
| %o6 | 3 | 5 | IN | 0 |

Figure 3

| Window | Reg. Type | Even_N/Odd_Win | Strand # | Comments |
|---|---|---|---|---|
| 0 | IN | 0 | 0 | RF cells for even windows |
| 0 | OUT | 1 | 0 | RF cells for odd windows |
| 1 | IN | 1 | 0 | RF cells for even windows |
| 1 | OUT | 0 | 1 | RF cells for odd windows |
| 2 | IN | 0 | 1 | RF cells for even windows |
| 2 | OUT | 1 | 1 | RF cells for odd windows |
| 3 | IN | 1 | 1 | RF cells for even windows |
| 3 | OUT | 0 | 2 | RF cells for odd windows |
| 4 | IN | 0 | 2 | RF cells for even windows |
| 4 | OUT | 1 | 2 | RF cells for odd windows |
| 5 | IN | 1 | 2 | RF cells for even windows |
| 5 | OUT | 0 | 3 | RF cells for odd windows |
| 6 | IN | 0 | 3 | RF cells for even windows |
| 6 | OUT | 1 | 3 | RF cells for odd windows |
| 7 | IN | 1 | 3 | RF cells for even windows |
| 7 | OUT | 0 | 0 | RF cells for odd windows |

Figure 4

| Reg. | Strand # | Window # | Reg. Type Bits | Even_N/Odd_Win |
|---|---|---|---|---|
| %I4 | 3 | 5 | Local | 1 |

*Figure 5*

| Window | Reg. Type | Even_N/Odd_Win | Strand # | Comments |
|---|---|---|---|---|
| 0 | Local | 0 | 0 | Local RF cells for window 0 |
| 1 | Local | 1 | 0 | Local RF cells for window 1 |
| 2 | Local | 0 | 1 | Local RF cells for window 2 |
| 3 | Local | 1 | 1 | Local RF cells for window 3 |
| 4 | Local | 0 | 2 | Local RF cells for window 4 |
| 5 | Local | 1 | 2 | Local RF cells for window 5 |
| 6 | Local | 0 | 3 | Local RF cells for window 6 |
| 7 | Local | 1 | 3 | Local RF cells for window 7 |

*Figure 6*

VERSATILE REGISTER FILE DESIGN FOR A MULTI-THREADED PROCESSOR UTILIZING DIFFERENT MODES AND REGISTER WINDOWS

BACKGROUND OF THE INVENTION

1. Field of the Invention

The present invention relates to processors and more particularly to register files within processors.

2. Description of the Related Art

Known processors provide registers for storing data or for providing status or control information regarding the state of the processor. A known method of organizing registers within a processor is via a register windowing technique to access a plurality of registers in a register file. With register windowing, a register window includes a predetermined number of contiguous registers, and the window can be moved linearly within the register file. At any given time, the register window permits program access to a subset of the total number of registers in the register file. Control registers are associated with the register window so that a program can manipulate the position of the window within the register file and monitor the status of the window.

Multi-threaded processors with register windows serialize register window management instructions or pay a high price in area for "flattening" their register windows, i.e., making all register windows available all the time. One of the major costs in implementing multi-threading within a processor is the replication of the architectural registers. For example, in a four thread processor, the number of registers is quadruplicated, resulting in a significant core area increase. A side-effect of a register window issue is a more challenging timing due to longer wires. The issue is compounded because register file (RF) cells are fairly large due to multiple ports.

The issue may be further complicated in architectures (e.g. the Sun Microsystems SPARC architecture) which use register windows to enable faster procedure calls. In these architectures, instructions such as a SAVE instruction and a RESTORE instruction are used to switch from one instruction window to another instruction window while overlapping the output register (OUT) of the caller with the input registers (IN) of the callee. Each register window also has local registers, which are not shared (i.e., the local registers belong only to the callee). Most implementations have several (e.g. eight) register windows for a single thread.

When the actual number of register windows is not enough for a particular function, the actual register windows are spilled to memory, to make room for new register windows. When returning to a procedure whose register windows were spilled to memory, the register windows are "filled" from the proper memory addresses. A register file implementing all the register windows in relatively large, multi-ported register file cells can be prohibitively large (and, possibly, slow). For example, an integer register file with eight register windows of 16 registers each would require, for a four threaded processor, 4*8*16=512 registers per processor (only for the register windows; there are also global registers and temporary registers which are part of the register file design; these registers, in a multi-threaded processor implementation, are per thread, but global across a thread's windows). The main advantage of such a register file is that all the windows' registers are, potentially, available for the pipe to read, so there is no need to serialize the pipe on window manipulating instructions (like SAVE or RESTORE).

The terms "thread" and "strand" are used for a multi-threaded processor design. The term "strand" is used for the processor's hardware resources supporting the execution of one software thread.

SUMMARY OF THE INVENTION

In accordance with the present invention, a register file design for use with a multi-threaded processor implementation having a multi-threaded mode and a single-threaded mode is set forth. In single-threaded mode the processor takes advantage of the inactive threads' register file resources to "flatten" the register windows of the only thread running in the pipeline and thus obtains a higher performance.

In one embodiment, the invention relates to a method for optimizing a register file hierarchy for a mode of operation in a multithreaded processor. The method includes providing a register file hierarchy with a plurality of register file cells, associating the plurality of register file cells with respective threads when the processor is operating in a multithreaded mode and flattening the plurality of register file cells with a single thread when the processor is operating in a single threaded mode. The register file cells correspond to threads of the multithreaded processor.

In another embodiment, the invention relates to a processor which includes a register file hierarchy with a plurality of register file cells wherein the register file hierarchy associates the plurality of register file cells with respective threads when the processor is operating in a multithreaded mode and flattening the plurality of register file cells with a single thread when the processor is operating in a single threaded mode. The register file cells correspond to threads of the processor.

In another embodiment, the invention relates to an apparatus for optimizing a register file hierarchy for a mode of operation in a multithreaded processor. The apparatus includes a register file hierarchy, means for associating the plurality of register file cells with respective threads when the processor is operating in a multithreaded mode and means for flattening the plurality of register file cells with a single thread when the multithreaded processor is operating in a single threaded mode. The register file hierarchy includes a plurality of register file cells. The register file cells correspond to threads of the multithreaded processor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
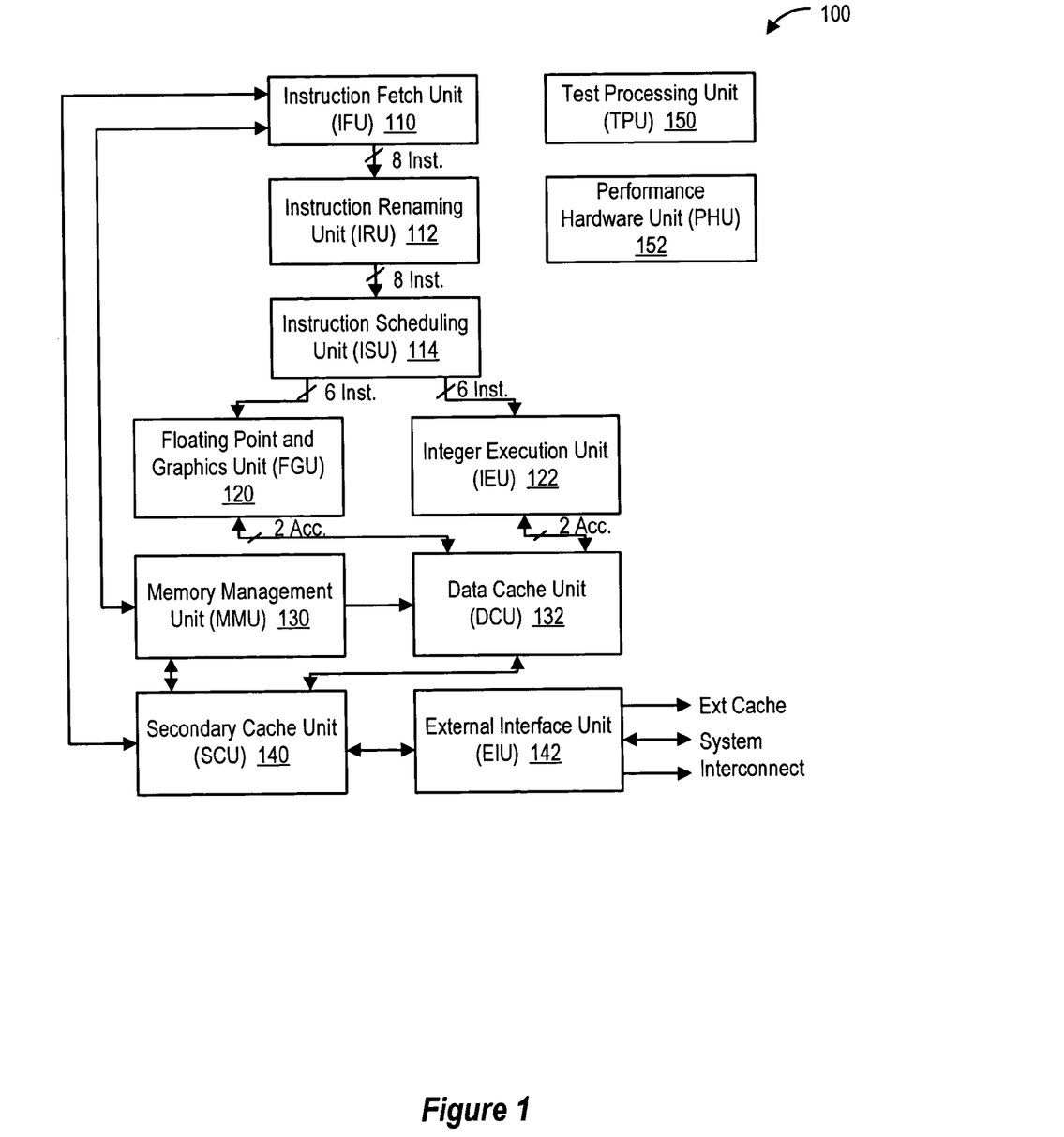
FIG. 1 shows a schematic block diagram of a multithreaded processor.

FIG. 1 shows a schematic block diagram of a multithreaded processor architecture. More specifically, processor 100 includes an instruction fetch unit (IFU) 110, an instruction renaming unit (IRU) 112, an instruction scheduling unit (ISU) 114, a floating point and graphics unit (FGU) 120, an integer execution unit (IEU) 122, a memory management unit (MMU) 130, a data cache unit (DCU) 132, a secondary cache unit (SCU) 140, an external interface unit (EIU) 142. The processor also includes a test processing unit (TPU) 150 and a performance hardware unit (PHU) 152.

The instruction fetch unit 110 includes an instruction cache and branch prediction logic. The instruction fetch unit 110 is coupled to the instruction renaming unit 112 as well as to the memory management unit 130 and the secondary cache unit 140.

The instruction renaming unit 112 is coupled to the instruction fetch unit 110 and to the instruction scheduling unit 114. The instruction renaming unit 112 includes dependency check logic and a helper instruction generator.

The instruction scheduling unit is coupled to the floating point and graphics unit 120 and to the integer execution unit 122. The instruction scheduling unit 114 includes an instruction window module.

The floating point and graphics unit 120 is coupled to the instruction scheduling unit 114 and to the floating point and data cache unit 132. The floating point and graphics scheduling unit 120 includes floating point and graphics execution units, a floating point register file and a floating point and graphics result buffer.

The integer execution unit 122 is coupled to the instruction scheduling unit 114 and to the data cache unit 132. The integer execution unit 122 includes integer execution units, an integer register file and virtual address adders.

The memory management unit 130 is coupled to the instruction fetch unit 110 and to the secondary cache unit 140. The memory management unit 130 includes a virtual address to physical address translation module as well as a translation lookaside buffer.

The data cache unit 132 is coupled to the floating point and graphics unit 120, to the integer execution unit 122 and to the secondary cache unit 140. The data cache unit 132 includes a data cache and a memory disambiguation buffer.

The secondary cache unit 140 is coupled to the memory management unit 130, the data cache unit 132 and the external interface unit 142. The secondary cache unit 140 includes a memory scheduling window as well as a unified L2 (level 2) cache.

The external interface unit 142 is coupled to the secondary cache unit 140 as well as to an external cache and an input/output (I/O) controller. The external interface unit 142 includes a transaction scheduling window, an external cache controller and an I/O system interconnection controller.

The test processing unit 150 is coupled to various units across the processor 100. The test processing unit 150 includes a power on controller as well as a clock controller.

The performance hardware unit 152 is coupled to various units across the processor 100. The performance hardware unit includes performance instrumentation counters as well as a sampling mechanism.

The instruction fetch unit 110 is responsible for fetching instructions from the instruction cache and then sending the resulting bundles of instructions to the instruction renaming unit 112. The instruction fetch unit 110 may fetch multiple instructions per cycle. Each group of instructions delivered to by the instruction fetch unit is referred to as a fetch bundle.

The instruction cache sources instructions to the processor pipeline by accessing a local instruction cache with predetermined cache indices. The instruction is virtually addressed by an instruction pointer generator. The branch prediction logic enables the instruction fetch unit 110 to speculatively fetch instructions beyond a control transfer instruction (CTI) even though the outcome or target of the control transfer instruction is not yet known.

The instruction renaming unit 112 decodes instructions, determines instruction dependencies and manages certain processor resources. The instruction scheduling unit 114 scheduling instructions from each thread for execution, replays instructions that are consumers of loads when the load misses in the data cache, maintains completion and trap status for instructions executing within the processor 100 and separately retires instructions in fetch order from each thread.

The floating point execution unit 120 implements and executes floating point instructions and graphics instructions. The integer execution unit 122 implements and executes fixed point integer instructions. Additionally, the integer execution unit 122 assists in execution of floating point instruction which depend on integer condition codes, integer registers and floating point condition codes.

The memory management unit 130 performs virtual address to physical address translation and includes a translation lookaside buffer that provides for a translation for the most frequently accessed virtual pages.

The data cache unit 132 provides the main interface between execution pipelines and memory within the processor 100. The data cache unit 132 executes load and store instructions as well as derivatives of load and store instructions. The data cache unit 132 provides a first level cache that is coupled directly to the execution units. The memory disambiguation buffer dynamically disambiguates memory addresses to enable execution of out of order instructions.

The secondary cache unit 140 provides a unified L2 cache. The L2 cache is controlled by the memory scheduling window which tracks accesses that miss in the L1 caches, the MMU and snoop system request. The memory scheduling window provides an interface between the instruction fetch unit and the L2 cache. The memory scheduling window also receives snoops from the external interface unit 142 and retired stores from the data cache unit 132.

The external interface unit 142 controls data flow among the L2 cache and the external cache, controls system interconnect, provides external cache control and provides a common interface for external processors, I/O bridges, graphics devices, and memory controllers.

The test processing unit 150 performs power on tests as well as diagnostic access within the processor 100. The test processing unit 150 provides clock control, design for testability and access to external interfaces.

The performance hardware unit 152 uses the performance instrumentation counters to gather aggregate information about various performance events across a plurality of instructions. The sampling mechanism gathers more detailed instruction history for specific executions of a sampled instruction.

Figure 2:
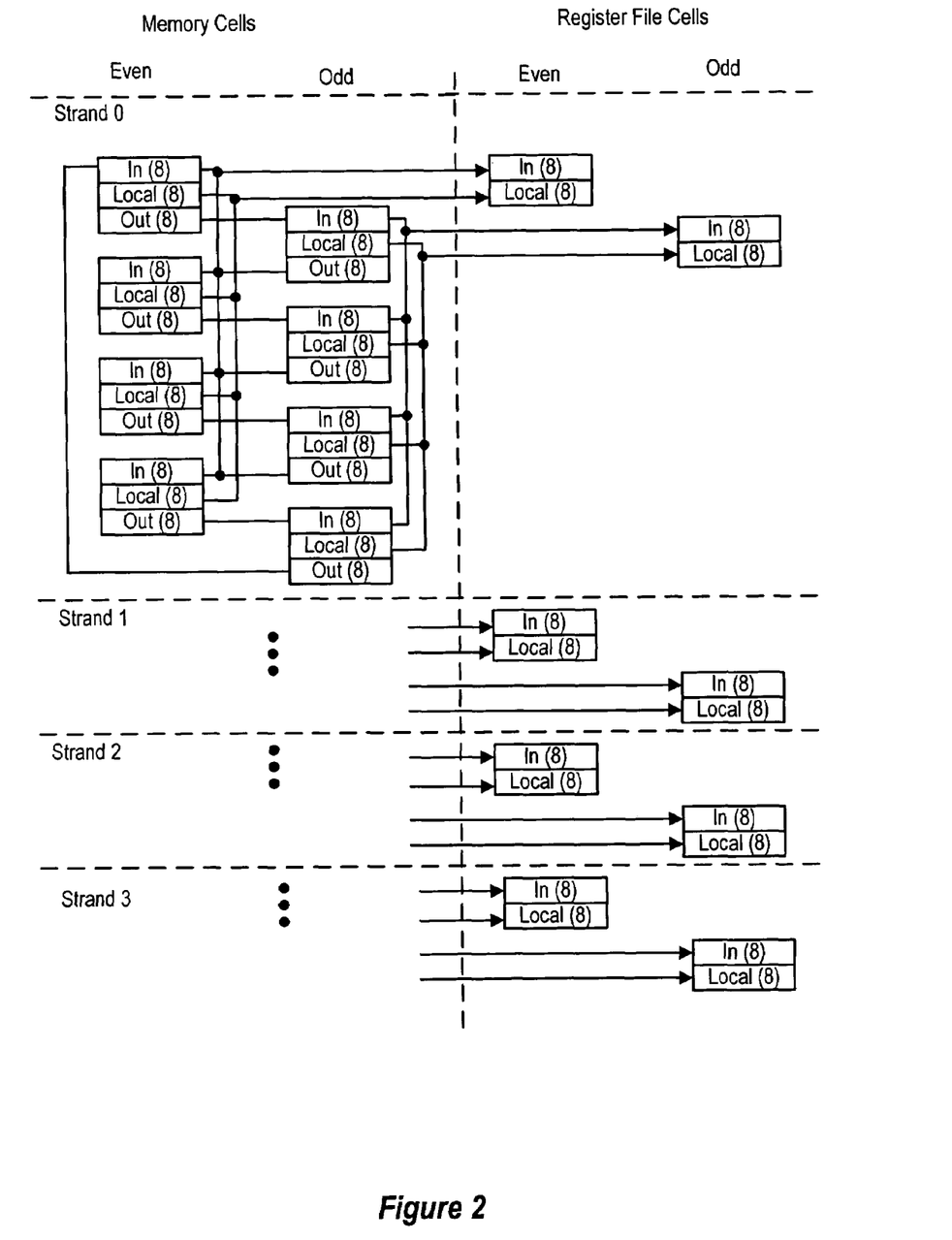
FIG. 2 shows a block diagram of a register file design in accordance with the present invention.

Referring to FIG. 2, a block diagram of a register file design in accordance with the present invention is shown. More specifically, the register file design of the processor 100 includes four strands, each with eight register windows, each window with eight IN registers, eight OUT registers and eight local registers. All four strands are active only in multi thread mode.

At any given time, in multithreaded mode only one register window is visible for a given thread, as determined by a current window pointer (CWP) register. The current window pointer is incremented or decremented by SAVE and RESTORE instructions, respectively. The SAVE and RESTORE instructions are generally executed on procedure call and return, respectively. Within the register file design, the IN registers contain incoming parameters, the LOCAL registers function as scratch registers and the OUT registers contain outgoing parameters. The register windows overlap partially, thus the OUT registers are renamed by the SAVE instruction to become the IN registers of the called procedure.

The register file design also makes use of single-port memory cells that are much smaller than multi-ported register file cells. The register file structure implements only a current (i.e., active) register window using relatively large, multi-ported register file cells. All these register file cells are backed up by small, single ported memory cells, which hold the values of all register windows. For example, a register window for the processor 100 includes eight IN registers, eight OUT registers and eight local registers in register file cells for the register window currently in use.

To allow these register file cells to be backed up by memory cells, the register file design uses the overlap between the OUT registers of a register window and the IN registers of the next window. Such an implementation provides separate IN registers for even and odd windows. This register file design reduces the number of windows in memory backing up these register file cells (from eight to four in a processor with eight register windows). The register file design includes logic to track which of the IN register file cells is the IN and which is the OUT for the current register window.

However, to avoid SAVE or RESTORE instructions from becoming serializing instructions in single threaded mode, the register file design includes an improved register hierarchy. Without the improved register hierarchy, SAVE or RESTORE instructions can cause the processor pipe to drain to update the architectural registers in register file cells before the current register window is saved in the memory cells for that window and the next window, requested by SAVE or RESTORE, is loaded in the register file cells. This occurrence affect to a lesser extent the performance on a processor core which is executing in multi-threaded (MT) mode, because the pipe switches between threads, reducing the SAVE or RESTORE penalty for an individual thread. However, when the processor 100 is executing in a single thread mode to achieve higher single-thread performance, there is no switching between threads, so the performance price is high for many applications. Accordingly, the improved register hierarchy uses the register hierarchy (register file cells backed up by memory cells for the register windows) and serializes the pipe on SAVE and RESTORE instructions when the processor is executing in multithreaded mode. The current window's register bits are in register file cells, while the value of all register windows are in stored in the memory cells. Each of the four active strands includes respective current windows in register file cells and register windows in memory cells. When the processor is executing in a single threaded mode, the register windows are flattened to use only the register file cells. When operating in single threaded mode, only one strand is executing, so the register file cells of the other strands within the processor are not in use. Thus, these unused register file cells are used by the running strand. A flattened register file allows the processor to access any register window at any time, so no pipe serialization is needed on SAVE and RESTORE instructions.

Figure 3:
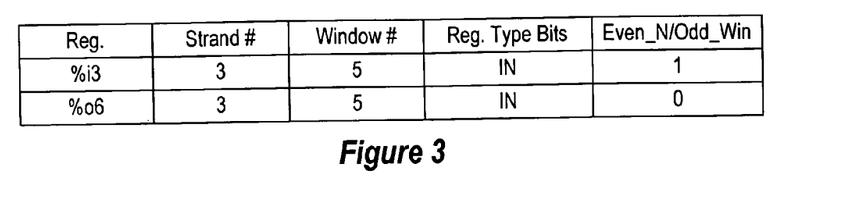
FIG. 3 shows an example of register addressing of a register file when the processor is operating in multithreaded mode.

FIG. 3 shows an example of register addressing of a register file when the processor is operating in multithreaded mode. In multithread mode, the registers of the processor are implemented in register file cells for the current window, with all the window registers' values in the backup memory cells. The IN and OUT registers of consecutive windows overlap, so the OUT registers of one window coincide with the IN registers of the next window. The practical consequence of overlap is to provide separate register cells for even and odd IN registers, each backed up by memory cells for the IN register values of only four register windows (even windows for even IN register cells and odd windows for odd IN register cells). FIG. 3 shows an encoding for the IN register 3 (% i3) and OUT register 6 (% o6) of window 5 for strand 3, when accessing the register file. The even/odd (Even_N/Odd_win) signal indicates, when inactive (e.g., 0), that an even register window is accessed (an odd window is accessed when the even/odd signal is active (e.g., 1)). The Even_N/Odd_win signal may be stored as a bit of the current window pointer. In the example shown in FIG. 3, to access the IN3 register for window 5, the IN register file cells for window 5 are accessed. This access is to an odd window (i.e. the Even_N/Odd_win address bit to the register file is one). Alternately, to access the OUT6 register for window 5, the IN register file cells of window 6 are accessed, which is an even window (i.e. the Even_N/Odd-win address bit to the register file is zero).

Figure 4:
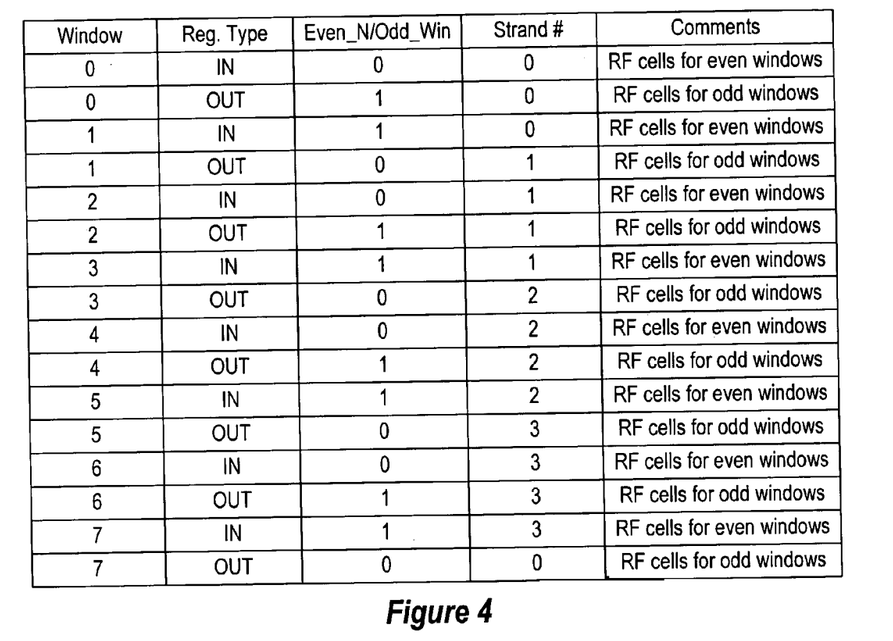
FIG. 4 shows an example of register addressing of a register file when the processor is operating in a single threaded mode.

FIG. 4 shows an example of register addressing of a register file when the processor is operating in a single threaded mode. More specifically, when operating in single threaded mode, all of IN and OUT registers of all of the windows are implemented in register file cells. This configuration takes advantage of the register file cells of the unused strands. As each of the four strands of the processor includes two copies of the eight IN registers in register file cells for each strand (one for even windows and one for odd windows), a total of eight times eight IN registers are present in register file cells. Thus, when executing in single thread mode, a single strand can flatten all its eight register windows' registers in register file cells. FIG. 4 shows the accessing of the IN/OUT registers in single threaded mode. The Strand # represents the register file number that would correspond to a particular strand if the register files were not flattened.

Figure 5:
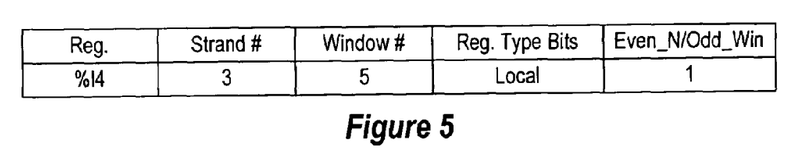
FIG. 5 shows an example of local register addressing of a register file when the processor is operating in a multi-threaded mode.

FIG. 5 shows an example of local register addressing of a register file when the processor is operating in a multi-threaded mode. More specifically, the local registers of the register file are implemented much like the IN/OUT registers, including splitting the local registers of odd and even register windows for each strand to different register file cells. This increases the number of registers implemented with register cells, as we double (from 8 to 16) the number of local registers in register cells. The number of memory cells does not change. A positive effect of this decision is that the register file cell design for local registers is the same as for IN/OUT registers: a register file cell backed up by four memory cells for the strand's (even or odd) windows.

As with the IN/OUT registers, access to the multithread mode implementation of local registers is straightforward. For example, local register L4 of window 5, strand 3 is addressed via the Even_N/Odd_win address bit to the register file set to one (because window 5 is an odd window). The strand number is also part of the register file address (there are four copies of odd and even local registers in register file cells, one per strand in multithread mode).

Figure 6:
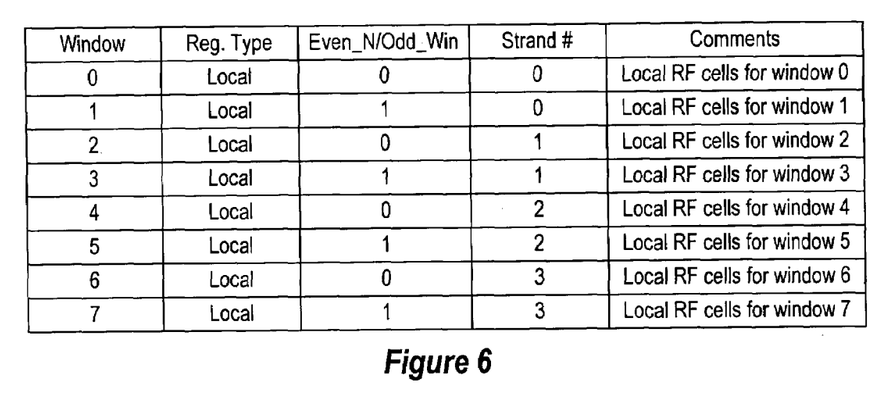
FIG. 6 shows an example of local register addressing of a register file when the processor is operating in a single threaded mode.

FIG. 6 shows the LOCAL register encoding for single thread mode. More specifically, all windows' local registers are implemented in register file cells, taking advantage of the register file cells of the unused strands (same as for IN/OUT registers, except that there is no overlap between the local registers of consecutive or any other windows). Each of the four strands of the processor includes two copies of the eight local registers in register file cells for each strand (one for even windows and one for odd windows). Thus the processor includes a total of eight times eight local registers in register file cells. Thus, when the processor is executing in single thread mode, a single strand can flatten all eight register windows local registers in register file cells. When operating in single thread mode, the Strand # represents the register file number that would correspond to a particular strand if the register files were not flattened.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while a particular processor architecture is set forth, it will be appreciated that variations within the processor architecture are within the scope of the present invention.

Also for example, while a particular register file architecture is set forth, it will be appreciated that other register file architectures are within the scope of the present invention.

Also for example, the above-discussed embodiments include modules and units that perform certain tasks. The modules and units discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules and units is for illustrative purposes. Alternative embodiments may merge the functionality of multiple modules or units into a single module or unit or may impose an alternate decomposition of functionality of modules or units. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for optimizing a register file hierarchy for a mode of operation in a multithreaded processor, the method comprising:

providing a register file hierarchy with a plurality of register file cells, the register file cells corresponding to threads of the multithreaded processor;

associating the plurality of register file cells with respective threads when the processor is operating in a multithreaded mode; and, flattening the plurality of register file cells with a single thread when the processor is operating in a single threaded mode;

wherein the register file cells include in registers, local registers and out registers for a currently active register window, the register file hierarchy overlaps out registers of the currently active register window with in registers of a next register window, the in and out registers in each overlapping pair are backed up by the same memory cells, and the memory cells backing up the plurality of register file cells are not accessed when the processor is operating in a single threaded mode.

2. The method of claim 1 wherein:

the plurality of register file cells correspond to respective register windows when the processor is operating in a single threaded mode.

3. The method of claim 1 wherein:

flattening the plurality of registers file cells allows the processor to access any register window at any time.

4. The method of claim 1 wherein:

when the processor is operating in multithreaded mode, register files of a current window are accessible while register files of other threads are stored in memory cells.

5. The method of claim 1 wherein:

the register file hierarchy is separated into even register files and odd register files.

6. A processor comprising:

a register file hierarchy with a plurality of register file cells, the register file cells corresponding to threads of the processor, the register file hierarchy associating the plurality of register file cells with respective threads when the processor is operating in a multithreaded mode and flattening the plurality of register file cells with a single thread when the processor is operating in a single threaded mode;

wherein the register file cells include in registers, local registers and out registers for a currently active register window, the register file hierarchy overlaps out registers of the currently active register window with in registers of a next register window, the in and out registers in each overlapping pair are backed up by the same memory cells, and the memory cells backing up the plurality of register file cells are not accessed when the processor is operating in a single threaded mode.

7. The processor of claim 6 wherein:

the plurality of register file cells correspond to respective register windows when the processor is operating in a single threaded mode.

8. The processor of claim 6 wherein:

flattening the plurality of registers file cells allows the processor to access any register window at any time.

9. The processor of claim 6 wherein:

when the processor is operating in multithreaded mode, register files of a current window are accessible while register files of other threads are stored in memory cells.

10. The processor of claim 6 wherein:

the register file hierarchy is separated into even register files and odd register files.

11. An apparatus for optimizing a register file hierarchy for a mode of operation in a multithreaded processor, the apparatus comprising:

a register file hierarchy, the register file hierarchy including a plurality of register file cells, the register file cells corresponding to threads of the multithreaded processor;

means for associating the plurality of register file cells with respective threads when the processor is operating in a multithreaded mode; and, means for flattening the plurality of register file cells with a single thread when the multithreaded processor is operating in a single threaded mode;

wherein the register file cells include in registers, local registers and out registers for a currently active register window, the register file hierarchy overlaps out registers of the currently active register window with in registers of a next register window, the in and out registers in each overlapping pair are backed up by the same memory cells, and the memory cells backing up the plurality of register file cells are not accessed when the processor is operating in a single threaded mode.

12. The apparatus of claim 11 wherein:
the plurality of register file cells correspond to respective register windows when the processor is operating in a single threaded mode.

13. The apparatus of claim 11 wherein:
flattening the plurality of registers file cells allows the processor to access any register window at any time.

14. The apparatus of claim 11 wherein:
when the processor is operating in multithreaded mode, register files of a current window are accessible while register files of other threads are stored in memory cells.

15. The apparatus of claim 11 wherein:
the register file hierarchy is separated into even register files and odd register files.

16. The method of claim 1, wherein each register file cell is backed up by a plurality of memory cells.

17. The method of claim 16, wherein at least one of the register file cells is backed up by a different plurality of memory cells than an other of the register file cells.

18. The method of claim 17, wherein the different plurality of memory cells is inaccessible to the other of the register file cells.

19. The processor of claim 6, wherein each register file cell is backed up by a plurality of memory cells.

20. The processor of claim 19, wherein at least one of the register file cells is backed up by a different plurality of memory cells than an other of the register file cells.

21. The processor of claim 20, wherein the different plurality of memory cells is inaccessible to the other of the register file cells.

22. The apparatus of claim 11, wherein each register file cell is backed up by a plurality of memory cells.

23. The apparatus of claim 22, wherein at least one of the register file cells is backed up by a different plurality of memory cells than an other of the register file cells.

24. The apparatus of claim 22, wherein the different plurality of memory cells is inaccessible to the other of the register file cells.

* * * * *